Dec. 1, 1964 R. L. TWEEDALE 3,159,289
GRAIN TANK AND CONVEYOR MECHANISM FOR COMBINES
Filed Nov. 30, 1962 2 Sheets-Sheet 1

INVENTOR.
Ralph L. Tweedale
BY
Wolfe, Hubbard, Voit & Osann
ATTORNEYS.

Dec. 1, 1964 R. L. TWEEDALE 3,159,289
GRAIN TANK AND CONVEYOR MECHANISM FOR COMBINES
Filed Nov. 30, 1962 2 Sheets-Sheet 2

INVENTOR.
Ralph L. Tweedale
BY
Wolfe, Hubbard, Voit & Osann
ATTORNEYS.

United States Patent Office 3,159,289
Patented Dec. 1, 1964

3,159,289
GRAIN TANK AND CONVEYOR MECHANISM FOR COMBINES
Ralph L. Tweedale, Southfield, Mich., assignor to Massey-Ferguson Inc., Detroit, Mich., a corporation of Maryland
Filed Nov. 30, 1962, Ser. No. 241,198
1 Claim. (Cl. 214—17)

This invention relates generally to crop harvesting machines such as self-propelled combines, and concerns, more particularly, an improved grain tank and conveyor mechanism for temporarily storing and handling harvested grain in such machines.

A self-propelled combine of the type with which the invention is concerned includes a pair of grain receiving tanks arranged to straddle the cleaning and separating unit of the combine. A crop conveyor at the bottom of the cleaning and separating unit collects the threshed grain and carries it to a grain elevator which lifts the grain to a filling conveyor which deposits the grain in the pair of tanks.

The invention lies in providing such a combine with a dually directed crop conveyor at the bottom of the cleaning and separating unit which divides the harvested grain into substantially equal portions and carries each portion to a separate one of a pair of grain elevators which lift the grain and deposit it into alternate ones of the side tanks. More particularly, the invention contemplates providing a vertically disposed transfer auger for unloading one of the side tanks through an inclined chute into the other side tank from which the grain is withdrawn by a discharge auger.

Figure 1:
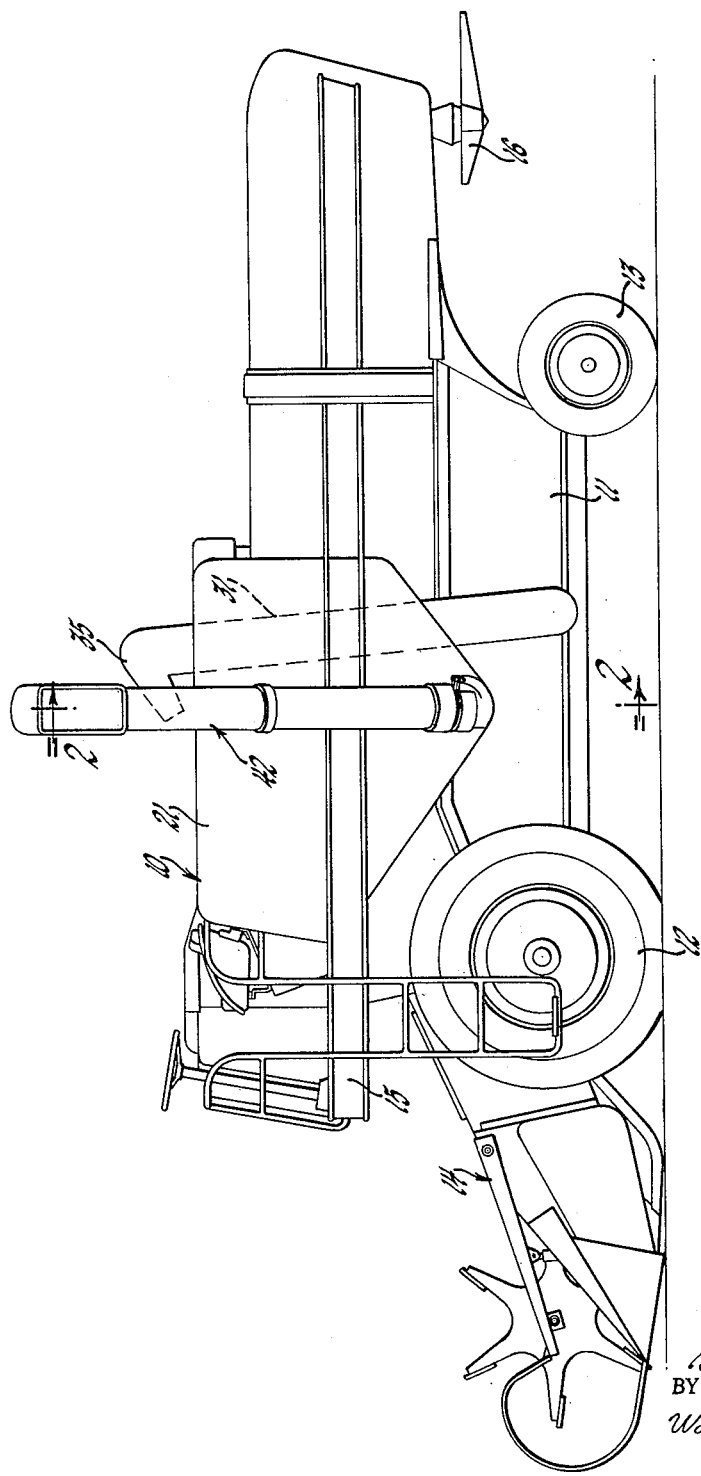
Figure 2:
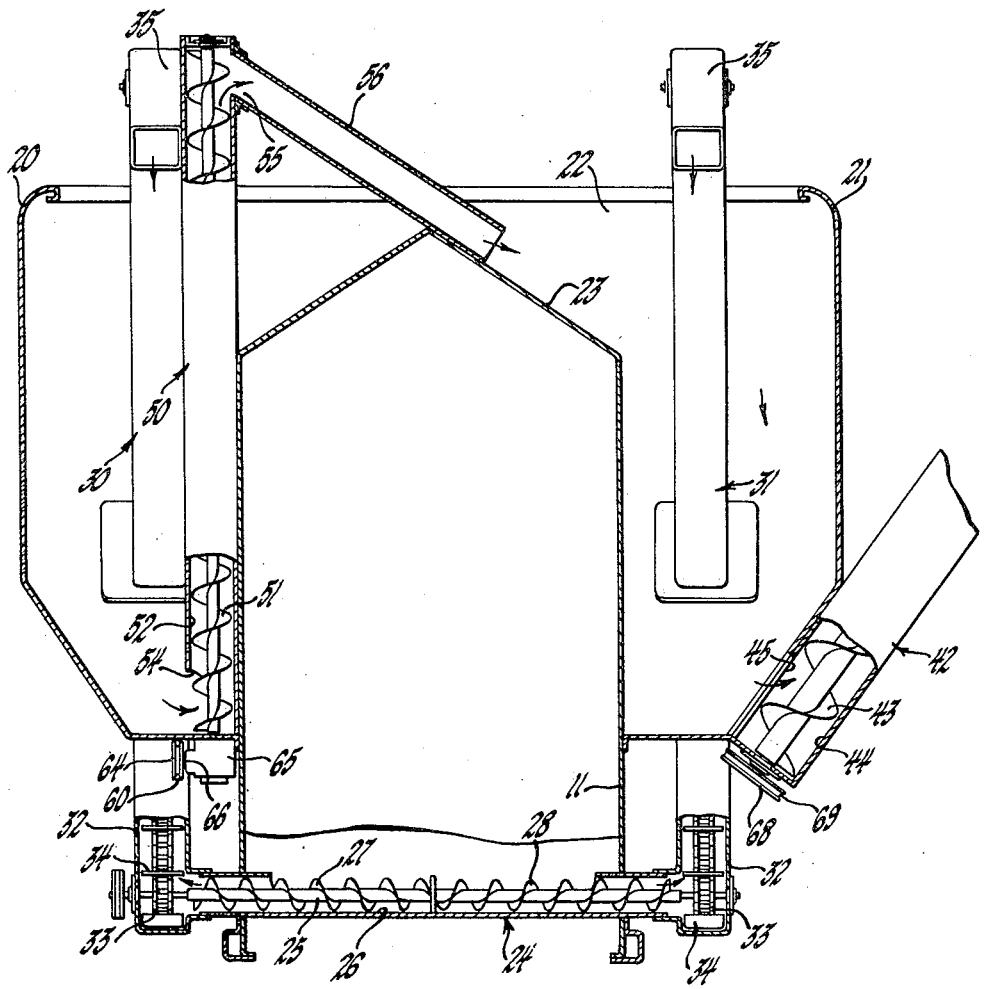

An example of the inventive grain tank and conveyor mechanism is shown in the accompanying drawings, in which:

FIGURE 1 is a side elevation of a self-propelled combine embodying the present invention; and FIG. 2 is an enlarged transverse sectional view taken approximately along line 2—2 in FIG. 1 through the storage tanks and cleaning and separating unit of the combine.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claim.

Turning first to FIGURE 1, there is shown a self-propelled combine 10 embodying the invention which includes a main body portion 11 supported by front driving wheels 12 and rear steering wheels 13. A grain header assembly 14 is supported at the forward end of the combine and an operator's platform 15 is disposed at the front of the combine so as to overlook the header assembly. The combine body 11 encloses grain cleaning and separating mechanisms, and a straw scatterer 16 journalled at the rear of the combine.

In order to receive and temporarily store the harvested grain, the combine 10 is provided with a pair of side or saddle tanks 20 and 21 extending down along the opposite sides of the combine body 11 and which are interconnected by a center tank portion 22 lying above an upwardly sloping or gabled top 23 of the combine body 11. To collect the harvested grain, a dually directed crop conveyor 24 is situated beneath the separating mechanism of the combine. The crop conveyor 24 includes a shaft 25 journalled in a tube 26. As shown in FIG. 2, a first auger flight 27 is wound on the left hand portion of the shaft 25 and a second auger flight 28 is wound on the right hand portion of the shaft 25. The two auger flights 27, 28 are adapted to divide the harvested grain and direct it outwardly from the center of the cleaning and separating unit of the combine.

To elevate the grain received and collected by the crop conveyor 24, separate loading elevators 30 and 31 are provided for each of the grain tanks 20, 21. Each of the loading elevators 30, 31 includes a rectangular housing structure 32 enclosing a continuous chain 33 on which a plurality of pusher paddles 34 are situated. The pusher paddles 34 lift the grain from the crop conveyor 24 and deposit it through a hood 35 at the top of the respective elevators 30, 31 and into the side tanks 20, 21.

Since the crop auger 24 includes double auger flights 27, 28 which direct the harvested grain in opposite directions, it will be appreciated that the harvested grain is divided and substantially equally proportioned between the two side tanks 20, 21. By depositing equal amounts of grain in each of the two tanks 20, 21 the combine can be kept in lateral balance as the amount of grain in each of the tanks increases.

In order to unload the combine, a discharge conveyor 42 is coupled to the side tank 21. The discharge conveyor 42 includes an auger 43 journalled in a tube 44 that extends upwardly and outwardly from the combine body 11. The discharge conveyor has an opening 45 through which grain is received from the bottom of the side tank 21.

To unload the grain from the side tank 20, a vertical transfer conveyor 50 is provided which temporarily moves the grain into the side tank 21. The transfer conveyor 50 includes an auger 51 journalled in a tubular passage 52 disposed vertically along one side of the combine cleaning and separating unit. An opening 54 in the bottom of the conveyor 50 receives grain from the side tank 20 and an opening 55 at the upper end of the conveyor discharges grain into a chute 56 which directs the grain down one side of the sloping roof 23 and into the other side tank 21.

For driving the transfer conveyor 50, a belt 60 couples the combine engine to a drive pulley 64 mounted on a gear case 65. The gear case 65 encloses a shaft 66 and bevel gears (not shown) which are drivingly coupled to the auger 51. The discharge conveyor 42 is driven by a pulley 68 coupled to the auger 43 and driven by a belt 69 suitably connected to a drive pulley on the combine engine.

To facilitate the rapid unloading of the side tanks 20, 21, the discharge conveyor 42 has a larger capacity than the transfer conveyor 50. To this end, it will be noted that the discharge auger 43 is larger in diameter than the transfer auger 51. Moreover, the discharge auger 43 is rotated at a speed effective to remove all of the grain from the side tank 20 contemporaneously with the transferral of the grain in side tank 20 by the transfer auger 51. Thus, there is no danger that the grain transferred from side tank 20 into the other side tank 21 will overflow, and in this way the two side tanks can be exhausted essentially simultaneously.

The embodiments of the invention in which an exclusive property or privilege is claimed are defined as follows:

An agricultural harvesting machine including a body portion enclosing grain cleaning and separating mechanisms with a pair of side tanks extending down along opposite sides of the machine body for temporarily storing harvested grain received from the cleaning and separating mechanisms, characterized by a dually directed crop conveyor disposed beneath the cleaning and separating mechanisms to divide the harvested grain into substantially equal portions, said crop conveyor including an auger shaft with a first auger wound on one end portion and extending laterally from beneath said cleaning and separating machanisms for directing grain in one direction and a second auger flight wound on the other end portion and extending laterally from beneath said cleaning and separating mechanisms for directing grain in the opposite direction, a first grain elevator situated adjacent the outer end of said first auger flight for lifting one portion of the harvested grain to one of said side tanks, a second grain elevator situated adjacent the outer end of said second auger flight for lifting the other portion of said grain to the other side tank, and drive means interconnecting said first and second grain elevators with said auger shaft for simultaneously powering said elevators incident to rotation of said conveyor.

References Cited in the file of this patent

UNITED STATES PATENTS

| | | |
|---|---|---|
| 2,614,707 | Bilterman | Oct. 21, 1952 |
| 2,614,708 | Hoffstetter | Oct. 21, 1952 |
| 2,633,255 | Hoffstetter | Mar. 31, 1953 |
| 2,642,980 | Soucek | June 23, 1953 |
| 2,813,704 | MacKissic | Nov. 19, 1957 |
| 2,925,184 | Powischill et al. | Feb. 16, 1960 |

FOREIGN PATENTS

| | | |
|---|---|---|
| 86,597 | Sweden | June 16, 1936 |
| 1,225,483 | France | Feb. 15, 1961 |